US007341179B2

(12) United States Patent
Tocher et al.

(10) Patent No.: US 7,341,179 B2

(45) Date of Patent: Mar. 11, 2008

(54) MEDIA CASSETTE SENSING SYSTEM

(75) Inventors: Alan Tocher, Edinburgh (GB); Douglas L. Milne, Dundee (GB)

(73) Assignee: NCR Corporation, Dayton, OH (US)

( * ) Notice: Subject to any disclaimer, the term of this patent is extended or adjusted under 35 U.S.C. 154(b) by 15 days.

(21) Appl. No.: 11/305,531

(22) Filed: Dec. 16, 2005

(65) Prior Publication Data

US 2007/0205259 A1 Sep. 6, 2007

(51) Int. Cl.
*G06Q 40/00* (2006.01)

(52) U.S. Cl. ........................................ 235/379

(58) Field of Classification Search ................ 235/379, 235/486

See application file for complete search history.

(56) References Cited

U.S. PATENT DOCUMENTS

| | | | |
|---|---|---|---|
| 5,561,281 A | 10/1996 | Eda et al. | |
| 2002/0079361 A1 | 6/2002 | Kosugi | |
| 2004/0129527 A1* | 7/2004 | Jonsson | 194/320 |
| 2004/0205024 A1* | 10/2004 | Washington et al. | 705/43 |

FOREIGN PATENT DOCUMENTS

| | | |
|---|---|---|
| EP | 1 304 664 A2 | 4/2003 |
| GB | 2 135 494 A | 8/1984 |

* cited by examiner

*Primary Examiner*—Michael G. Lee
*Assistant Examiner*—Tuyen Kim Vo
(74) *Attorney, Agent, or Firm*—Priest & Goldstein PLLC

(57) ABSTRACT

The invention provides a sensing system for a self-service terminal and a media cassette for use in such a self-service terminal. The sensing system for a self-service terminal comprises an aerial comprising at least one receive circuit and a processor arranged in use to determine the position of a first resonant circuit mounted in a media cassette inserted into the terminal based on a signal received via the aerial.

11 Claims, 9 Drawing Sheets

MEDIA CASSETTE SENSING SYSTEM

TECHNICAL FIELD

The present invention relates to a sensing system for a media cassette. It is particularly related to, but in no way limited to, a sensing system for a media cassette for use in a self-service terminal (SST) or for a currency cassette for use in an automated teller machine (ATM).

BACKGROUND

Currency cassettes provide ATMs with a source of bank notes and are strong metal or plastic boxes comprising a lid releasably coupled to a body. One end of the body includes a covered aperture that is automatically opened when the cassette is inserted into a currency dispenser and automatically closed when the cassette is removed from the currency dispenser. The opposite end of the body includes a handle for carrying the cassette which also aids in insertion and removal of the cassette.

The use of a currency cassette in an ATM can be described with reference to FIG. 1 which shows a schematic side elevation view of a cash dispenser unit 73 of an ATM. The cash dispenser unit 73 holds a number of currency cassettes 89 each holding a stack of currency notes 68. Each cassette 89 holds only one denomination of currency notes, but different cassettes may contain different denominations. The notes 68 are held in place in the cassette by means of a pusher plate 69 which urges the stack of notes to one end of the cassette. It is necessary for the dispenser to detect automatically what currency is contained within each cassette. This is currently achieved by means of a pattern of magnets in the cassette which can be detected by the dispenser; cassettes with different denominations of notes having different patterns of magnets.

When one or more notes are to be dispensed from a particular cassette, the pick mechanism 74 associated with the cassette draws a note from the cassette such that its leading edge is gripped between drive rollers 90. The note is then fed along the feed path 72 by further drive rollers 92, through a retard mechanism 10 to the stacker wheel assembly 75. In operation, the stacker wheel assembly 75 rotates continuously in a counter-clockwise direction (for the arrangement shown in FIG. 1) and the note is fed into a compartment 81 formed between adjacent tines 78. If more than one note is to be dispensed, each note is fed into a successive compartment 81 as the stacker wheel assembly 75 rotates. Having completed half a rotation, the note is removed from the stacker wheel assembly 75 by fingers 94 of a stripper plate assembly 96 pivotally mounted on a shaft 98. Once removed from the stacker wheel, the note is placed on a belt 100 resting against the stripper plate assembly 96 and any subsequent notes which are to be dispensed simultaneously with the first note are placed on top of the first note to form a bundle 68'. When the required amount of notes (which may be just one note) have been assembled into the bundle 68', a pair of belts 102 (only one of which is shown in FIG. 1) is rotated on a shaft 104 such that the bundle 68' is trapped between the belts 100, 102. The bundle is then fed between belts 100, 102, 106, 108 through a note exit slot 110 in the housing 112 of the cash dispenser unit 73 to a position where the bundle 68' can be collected by the user of the ATM. If a multiple feeding is detected in the course of stacking the bundle of notes 68' or one or more of the notes is rejected for any reason, the bundle is not fed to the note exit slot 110. Instead the stripper plate assembly 96 is pivoted into a position as shown by the dashed outline 96' and the belts 100, 102 are operated in the reverse direction to deposit the bundle 68' into a reject note container 114 via an opening 116.

In order to detect when a cassette is about to run out of notes, a cassette is equipped with a "notes low" sensing system comprising a magnet located in the pusher plate 69 and a Reed switch located in the end of the cassette 89 near the pick mechanism 74. When the magnet in the pusher plate 69 gets close to the Reed switch it causes the contacts to close and the "notes low" situation is sensed.

Several problems exist with known currency cassettes. Firstly, if the cassette is not fitted correctly into the dispenser, the dispenser may detect an incorrect pattern of magnets and therefore incorrectly identify the denomination of currency in the cassette. This may result in incorrect amounts of money being dispensed by the ATM. Incorrect fitting of the cassette may also cause repeated failures of the pick mechanism.

Another problem is that the "notes low" sensing system is very variable and inaccurate. This causes problems in scheduling replacement/refilling of currency cassettes and can lead to dispensers running out of notes unexpectedly. Additionally, where an ATM has a low level of usage, an operator may choose to operate with cassettes which are never filled to capacity but instead are only filled with a few hundred notes each time. This may result in the operator permanently experiencing a "notes low" situation such that the sensing system is useless and the operator cannot determine when to replenish cassettes to avoid running empty.

The invention seeks to provide an improved sensing system and sensing method for media cassettes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect provides a media cassette for a self-service terminal comprising: a cassette body; a pusher plate moveably mounted in the cassette body for urging media towards a pick end of the cassette body; and a resonant circuit mounted on the pusher plate, wherein in use the position of the resonant circuit in the cassette body can be remotely detected by the self-service terminal into which the cassette is inserted.

Advantageously, this provides the operator of the self-service terminal with accurate information on the fill level of the cassette which assists in scheduling cassette replacement/replenishing and reduces the likelihood of the cassette becoming empty unexpectedly.

Preferably, the media cassette further comprises: one or more additional resonant circuits mounted inside the cassette body in a plane parallel to a side of the cassette body, wherein in use the position or frequency of the resonant circuit in the cassette body can be remotely detected by the self-service terminal into which the cassette is inserted.

Advantageously, these additional resonant circuits may be used to identify the cassette type and/or to identify whether the cassette has been correctly positioned in the terminal.

Preferably the cassette body comprises a transparent portion adjacent to a resonant circuit.

Advantageously, this allows a user to visually check the type of a cassette by viewing features of or features printed on the resonant circuit.

A second aspect provides a sensing system for a self-service terminal comprising: an aerial comprising at least one receive circuit; and a processor arranged in use to determine the position of a first resonant circuit mounted in a media cassette inserted into the terminal based on a signal received via the aerial.

Advantageously, this enables the self-service terminal to automatically detect information about the media cassette, such as whether the cassette has been correctly fitted into the terminal, the fill level of the cassette and the cassette type.

Preferably the aerial further comprises transmit circuitry for generating an alternating electro-magnetic field.

Preferably the sensing system further comprises means for calculating a cassette fill metric based on the position of the first resonant circuit.

Advantageously this provides an accurate indication of the cassette fill level.

Preferably the processor is further arranged to determine the position of a second resonant circuit mounted in a media cassette inserted into the terminal based on a signal received via the aerial, the system further comprising: means for calculating a cassette fill metric based on the positions of the first and the second resonant circuits.

Advantageously, this may remove any variability in the measurement of the position of the first resonant circuit caused by manufacturing variations.

Preferably the sensing system further comprises: means for determining if a cassette is correctly inserted into the terminal based on the position of the second resonant circuit.

Preferably the cassette fill metric is a percentage fill of the cassette.

Advantageously, this does not require any calibration during the life of the cassette and is not affected by differences in stacking of media dependent on the age/wear of the media.

Preferably the processor is further arranged to determine the position of a third resonant circuit mounted in a media cassette inserted into the terminal based on a signal received via the aerial, the system further comprising: means for determining a cassette type associated with the cassette based on the rotational position of the third resonant circuit.

Advantageously this provides an accurate automatic detection system to identify the type of cassette inserted into the terminal.

Preferably the sensing system further comprises: means for determining if a cassette is correctly inserted into the terminal based on the position of the first resonant circuit.

Preferably the sensing system further comprises: means for providing an alarm if a cassette is determined to be incorrectly inserted into the terminal based on the position of the first resonant circuit.

Preferably the sensing system further comprises: means for determining a cassette type associated with the cassette based on the rotational position of the first resonant circuit.

A third aspect provides a method of detecting the percentage fill of a media cassette comprising the steps of: detecting the position of a resonant circuit mounted in the media cassette; and calculating the percentage fill from the detected position.

A fourth aspect provides a media cassette substantially as described with reference to FIGS. 2 and 3 of the drawings.

A fifth aspect provides a self-service terminal substantially as described with reference to FIG. 2 of the drawings.

A sixth aspect provides a sensing system for a media cassette substantially as described with reference to FIGS. 2 and 3 of the drawings.

A further aspect of the invention provides a media cassette for a self-service terminal comprising: a cassette body and a resonant circuit mounted on a side of the cassette body, wherein in use the position of the resonant circuit can be remotely detected by the self-service terminal into which the cassette is inserted.

The method may be performed by firmware or software in machine readable form on a storage medium.

This acknowledges that firmware and software can be valuable, separately tradable commodities. It is intended to encompass software, which runs on or controls "dumb" or standard hardware, to carry out the desired functions. For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
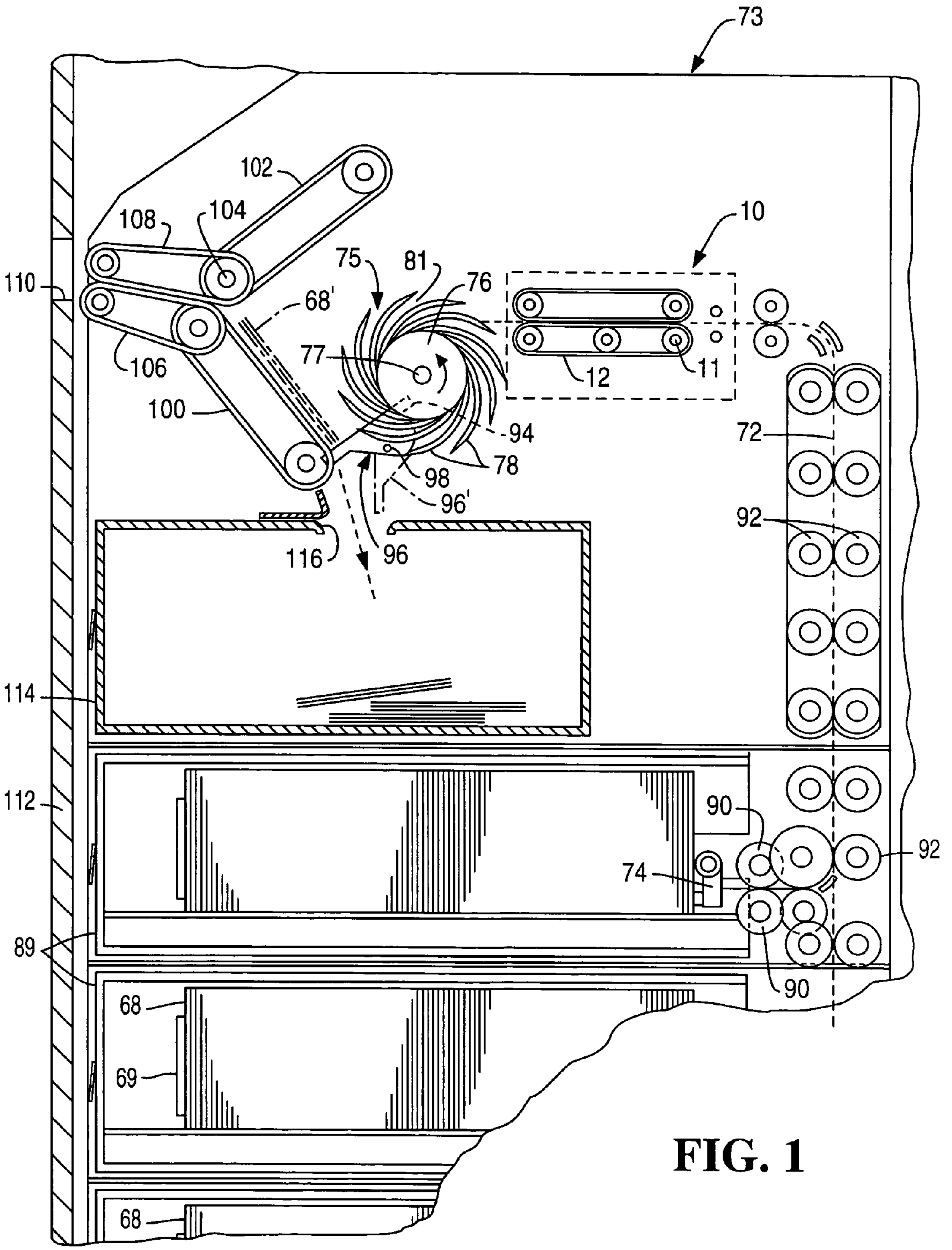
FIG. 1 is a schematic side elevation of a cash dispenser unit of an ATM.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

Figure 2:
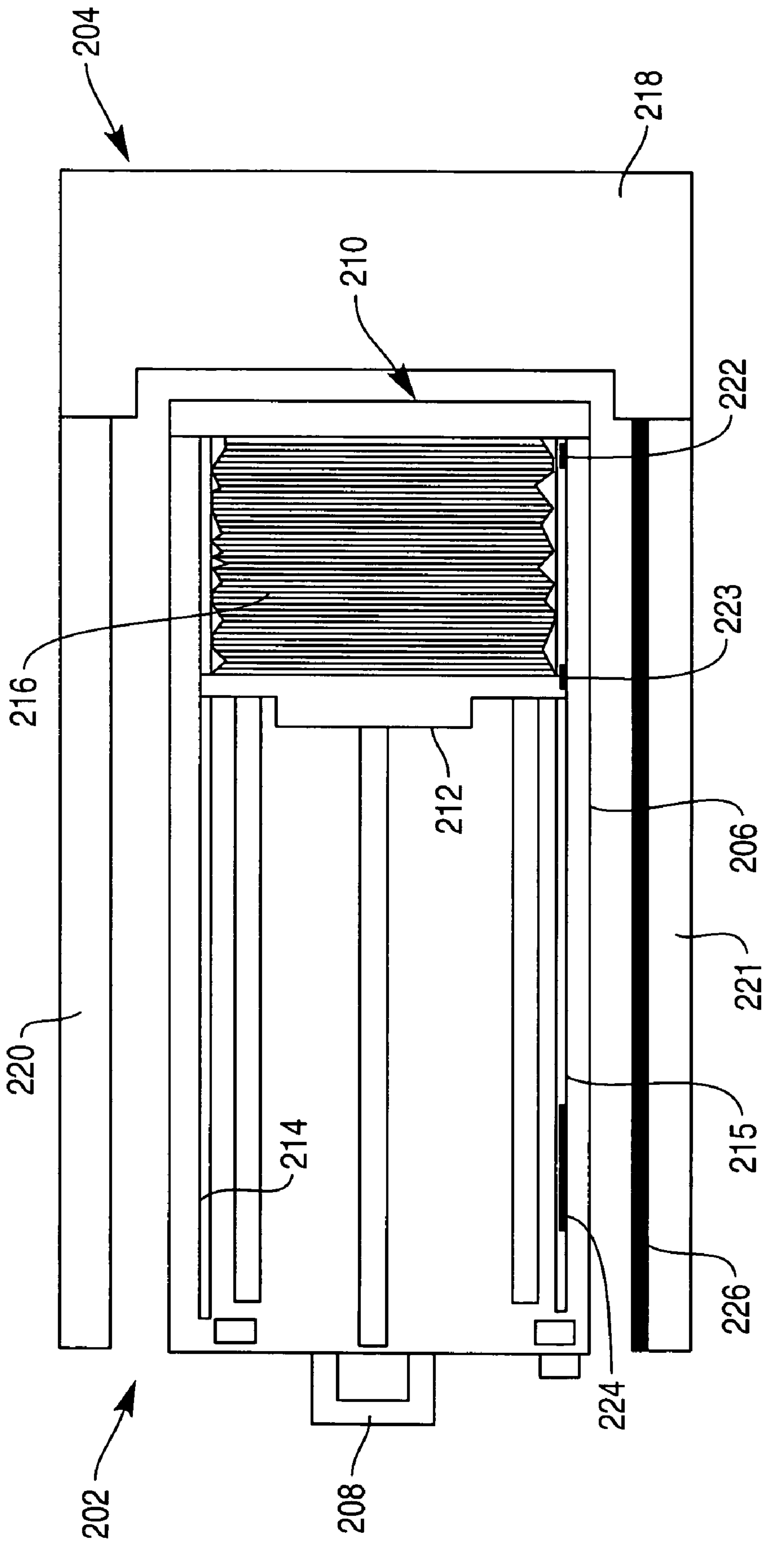
FIG. 2 is a simplified schematic diagram of a media cassette inserted into a media dispenser.

FIG. 2 shows a simplified schematic diagram of a media cassette 202 inserted into a media dispenser 204. For sake of clarity, only those parts of the cassette and dispenser required to explain the invention are shown in FIG. 2 and the lid of the cassette is not shown so that the inside of the cassette is visible. The cassette 202 comprises a body 206, and lid (not shown). The body has a handle 208 pivotably mounted at one end and a pick area 210 at the opposite end. A pusher plate 212 is mounted in the body and is urged towards the pick end of the cassette by a resilient member (not shown). The pusher plate 212 is mounted above two lateral guides 214, 215 for guiding opposite short edges of bank notes 216 or other media as the bank notes are urged towards the pick end of the cassette. The dispenser 204 includes a pick mechanism 218 which includes two parallel guides 220, 221 which are parallel to the inserted position of the cassette and assist in the positioning of the cassette 202 into the dispenser 204. The cassette 202 is fitted into the dispenser 204 by means of a latching mechanism (not shown). The latching mechanism includes a spring arrangement such that if the cassette is not latched properly into the dispenser, it is forced away from the pick mechanism 218 of the dispenser leaving a gap between the dispenser and the cassette of approximately 10 mm.

The arrangement shown in FIG. 2 also includes a sensing system comprising 3 printed circuit boards (PCBs) 222-224 mounted in the cassette 202 which each comprise a resonant circuit, a PCB 226 mounted in the dispenser 204 which comprises one or more aerials and processing electronics in the dispenser 204 (not shown). The PCB 226 is mounted on one of the guides 221 in a plane which is parallel to the side of the cassette 202 and also parallel to the plane(s) containing the resonant circuit PCBs 222-224.

The resonant circuits 222-224 may, for example, comprise Sensopad (trade mark) pucks, and the aerial 226 may, for example, comprise a Sensopad (trademark) pad as produced by Sensopad Technologies Ltd. The resonant circuits 222-224 will be referred to herein as pucks and the aerial 226 will be referred to herein as a pad, however a skilled person will appreciate that resonant circuits and aerials other than those supplied by Sensopad Technologies Ltd may be used.

The sensing system relies on inductance to operate, with transmit circuits in the pad 226 generating an alternating electro-magnetic field which induces currents in the pucks 222-224. As a result of these induced currents, each puck generates an alternating electro-magnetic field and the resultant electro-magnetic field is detected by receive circuits in the pad 226. The receive circuits in the pad are electrically isolated from the transmit circuits in the pad. The processing electronics can determine, from the received signal, the positions of each puck 222-224 relative to the pad 226. The processing electronics are described in more detail below with reference to FIG. 7.

Figure 3:
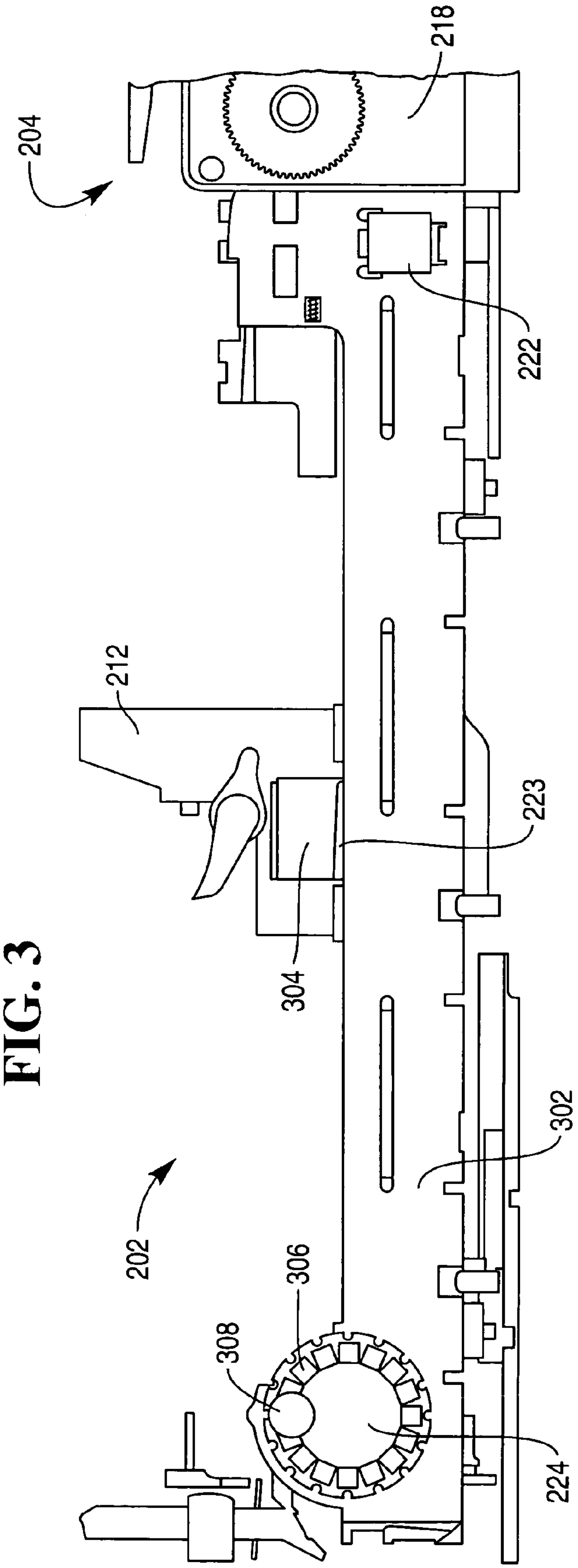
FIG. 3 shows a side elevation of parts of a media cassette.

FIG. 3 shows a side elevation of parts of a media cassette 202 and dispenser 204, which shows the position of the three pucks 222-224. Two of the pucks 222, 224 are mounted in the side of the dispenser 302 whilst the third puck 223 is mounted in a housing 304 attached to the pusher plate 212.

Figure 4:
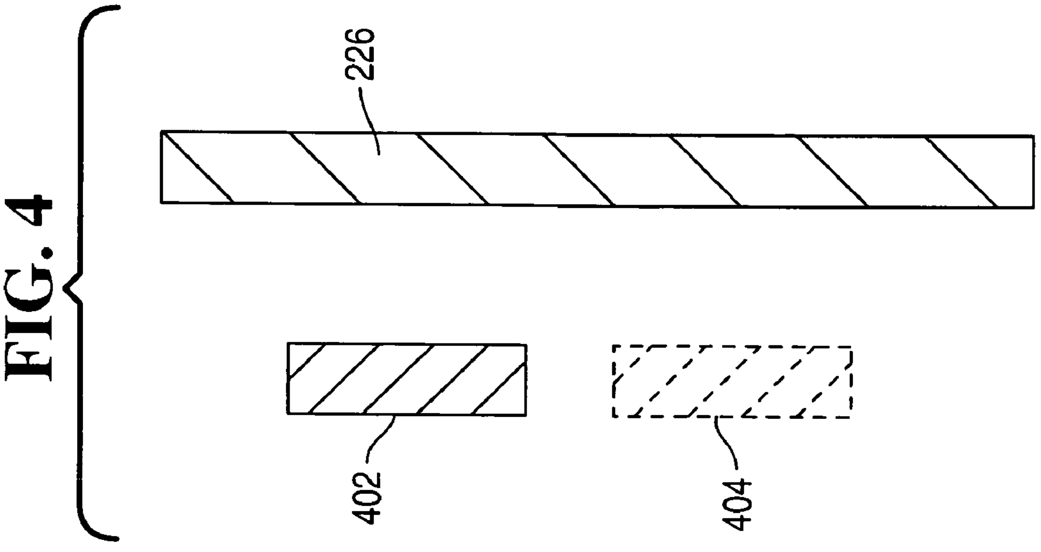
FIG. 4 shows a schematic diagram of puck position relative to a pad.

A first puck 222, referred to herein as the 'cassette home puck', may be used in combination with the pad 226 to determine whether the cassette is fully latched into the dispenser. As described earlier the cassette is fitted into the dispenser by means of a latching mechanism which includes a spring arrangement such that if the cassette does not latch properly into the dispenser, the cassette is forced away from the dispenser by a measurable amount, typically around 10 mm. FIG. 4 shows a schematic diagram of the pad 226 and the cassette home puck 222 in a first position 402 which would indicate that the cassette is correctly latched into the dispenser and a second position 404 which would indicate that the cassette is not correctly latched into the dispenser. In the situation where the dispenser detects that the cassette home puck is not in the position 402 indicating the latching of the cassette, an alarm could be activated. This alarm may comprise an audible alarm, to notify an individual who may be inserting the cassettes into the ATM, and also an alarm or other alert provided to the operator of the ATM. This cassette home sensing may be useful both at the point when the cassettes are being inserted and at a later stage in the event that a cassette becomes de-latched due to vibration, mechanical failure etc. In addition to alerting the operator that one of the cassettes is not correctly latched into the ATM, the detection of this non-latched cassette may also affect the operation of the ATM. The ATM may continue to operate and dispense currency but not attempt to pick any notes from the affected cassette. This enables the ATM to remain in operation whilst someone is sent to rectify the problem of the non-latched cassette.

Figure 5:
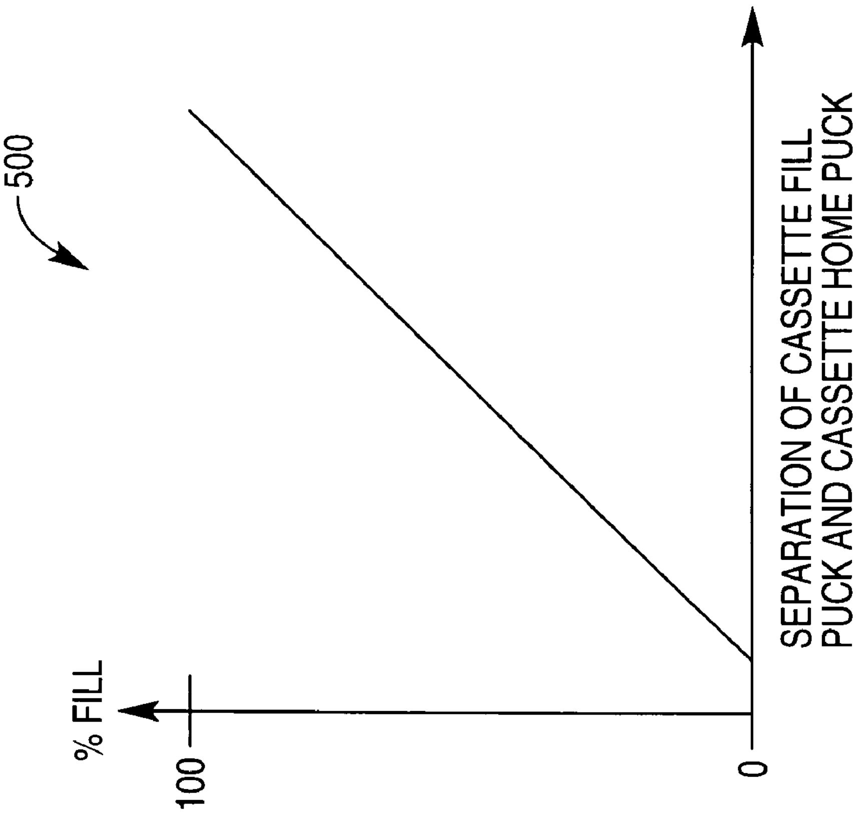
FIG. 5 shows an example graph of the relationship between the separation of the cassette fill puck and the cassette home puck and the percentage fill of the cassette.

A second puck 223, referred to herein as the 'cassette fill puck' or 'pusher plate puck' may be used in combination with the pad 226 to provide an indication of how full the cassette is, for example in the form of the percentage fill. The relationship between percentage fill and position of the cassette fill puck 223 may be a linear relationship. The percentage fill may be related to an absolute position measurement of the puck or alternatively the percentage fill may be related to a position measurement made with reference to another point, such as the position of the cassette home puck 222. Using a relative position measurement in this way may be beneficial as it may remove some variability from the measurement caused by variability in the cassette manufacture. FIG. 5 shows an example graph 500 of the relationship between the separation of the cassette fill puck 223 and the cassette home puck 222 and the percentage fill of the cassette. This provides accurate feedback to the operator of the fill level of the cassette which will assist with scheduling of cassette replacement/replenishing and reduce the likelihood of the cassette becoming empty unexpectedly.

Other fill metrics may be used instead of percentage fill, such as an indication of the number of notes (or pieces of other media) remaining in the cassette. However, percentage fill may be beneficial for media which is reused, such as currency notes, because old notes stack less closely than new notes and so the number of notes that can be contained in cassette when 100% full will vary. This may not be an issue with media which is not reused (e.g. train tickets) or with more robust media (e.g. top-up cards or plastic media).

Figure 6:
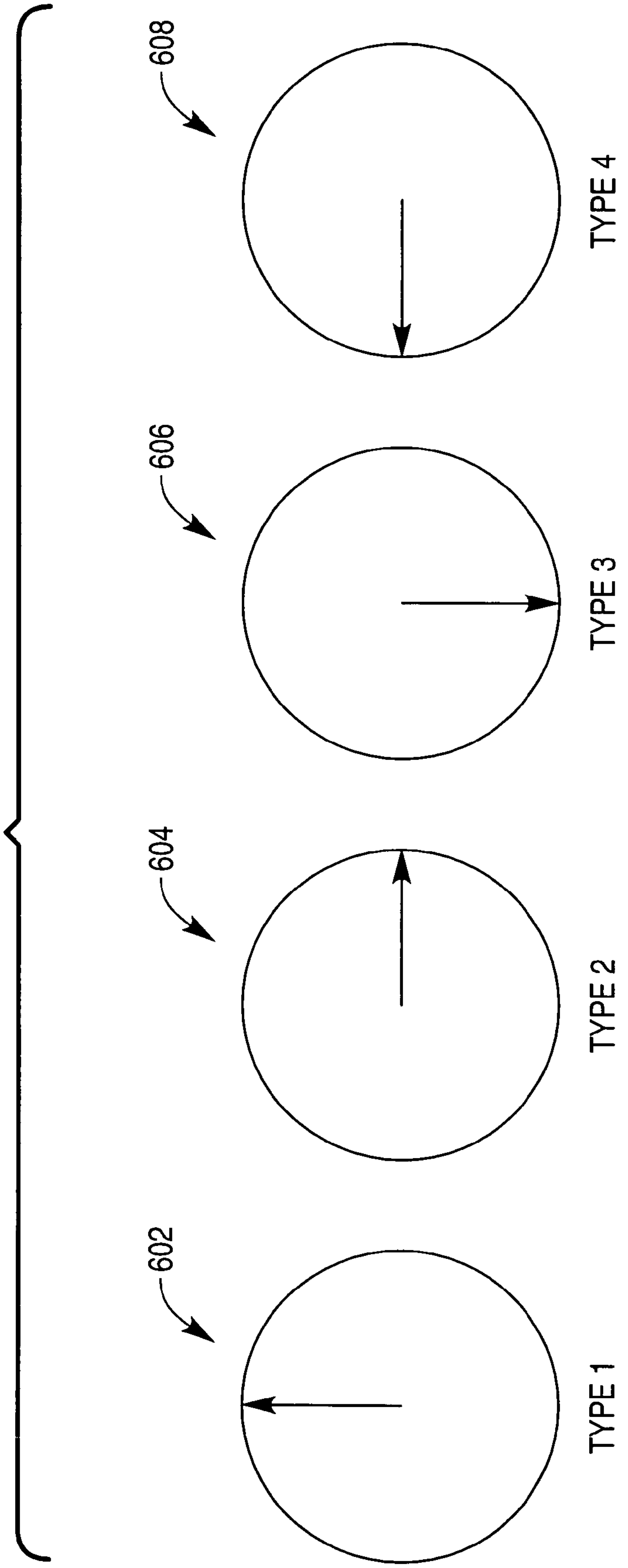
FIG. 6 shows a cassette ID puck in four different orientations.

A third puck, 224 referred to herein as the 'cassette ID puck' may be used in combination with the pad 226 to identify the cassette type, e.g. to determine the denomination of currency note stored within the cassette. The cassette ID puck comprises a substantially circular resonant circuit, as shown in FIG. 3. The cassette type is identified by determining the rotational position of the puck relative to the pad, as can be explained with reference to the simple example shown in FIG. 6. FIG. 6 shows a cassette ID puck in 4 different rotational positions, 602, 604, 606, 608 each indicating a different cassette type. The arrow on the puck is shown for purposes of illustration only and may not be visible on a puck. The limit to the number of cassette types that can be distinguished is determined by the degree of accuracy to which the rotational position can be detected by the processing electronics. The cassette ID puck 224 shown in FIG. 3 may be used to identify one of 16 different cassette types. This provides a sufficient number of cassette type options whilst also providing a large angular separation between positions compared to the accuracy of the sensing system. This ensures that the sensing system either detects a correct cassette ID or an invalid ID (a rotational position which does not correspond to any ID) and does not return what appears to be a valid ID but is actually incorrect. The cassette ID puck 224 shown in FIG. 3 additionally has 16 screen printed features 306 on it. Each feature may include alphanumeric markings (e.g. numbers 1-16, letters A-P, actual currency denominations etc) and may allow an operator to visually check the type of a cassette by viewing the features on the puck through a transparent window 308 provided in the side wall of the cassette.

The cassette ID puck 224 may be mounted on a spindle or other moveable mount such that the type may be set by an operator. For example, the type (or identity) may be set by an operator once the cassette has been filled to identify the denomination of currency note within the cassette. The mounting of the cassette ID puck may be such that it is latched into position so that it cannot inadvertently be changed when the cassette is in transit.

Figure 7A:
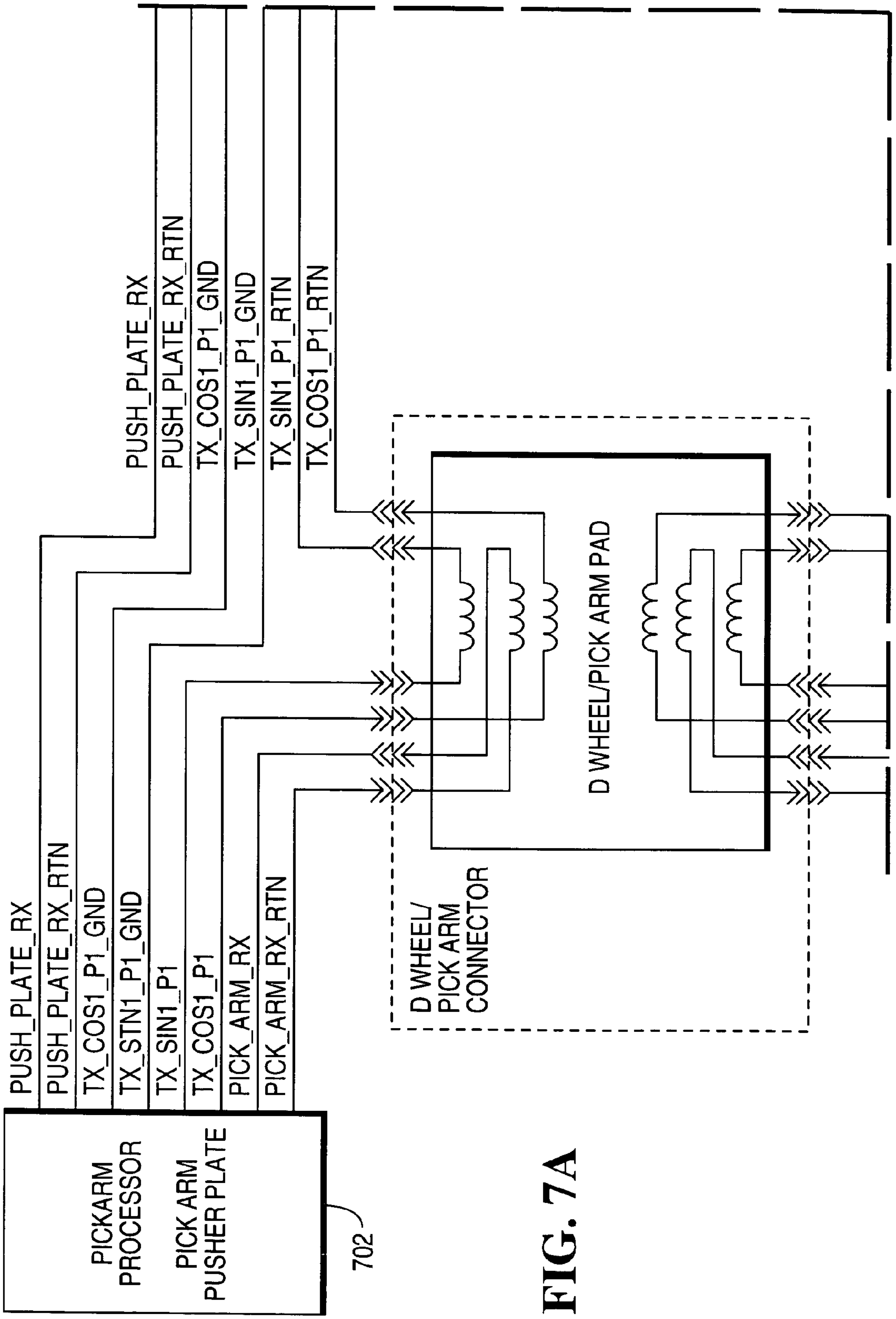
FIG. 7 is an example signal routing diagram.
Figure 7B:
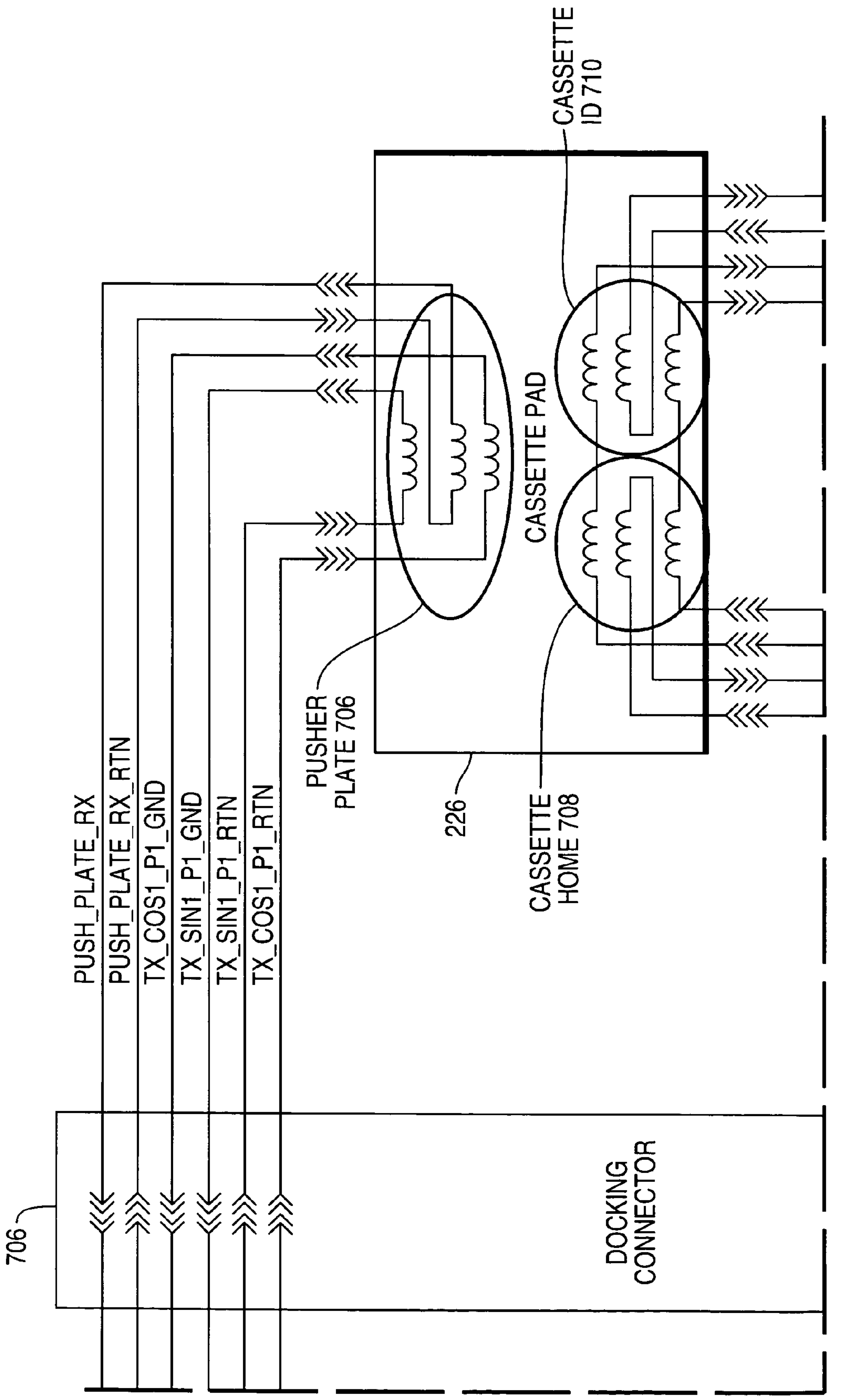
Figure 7C:
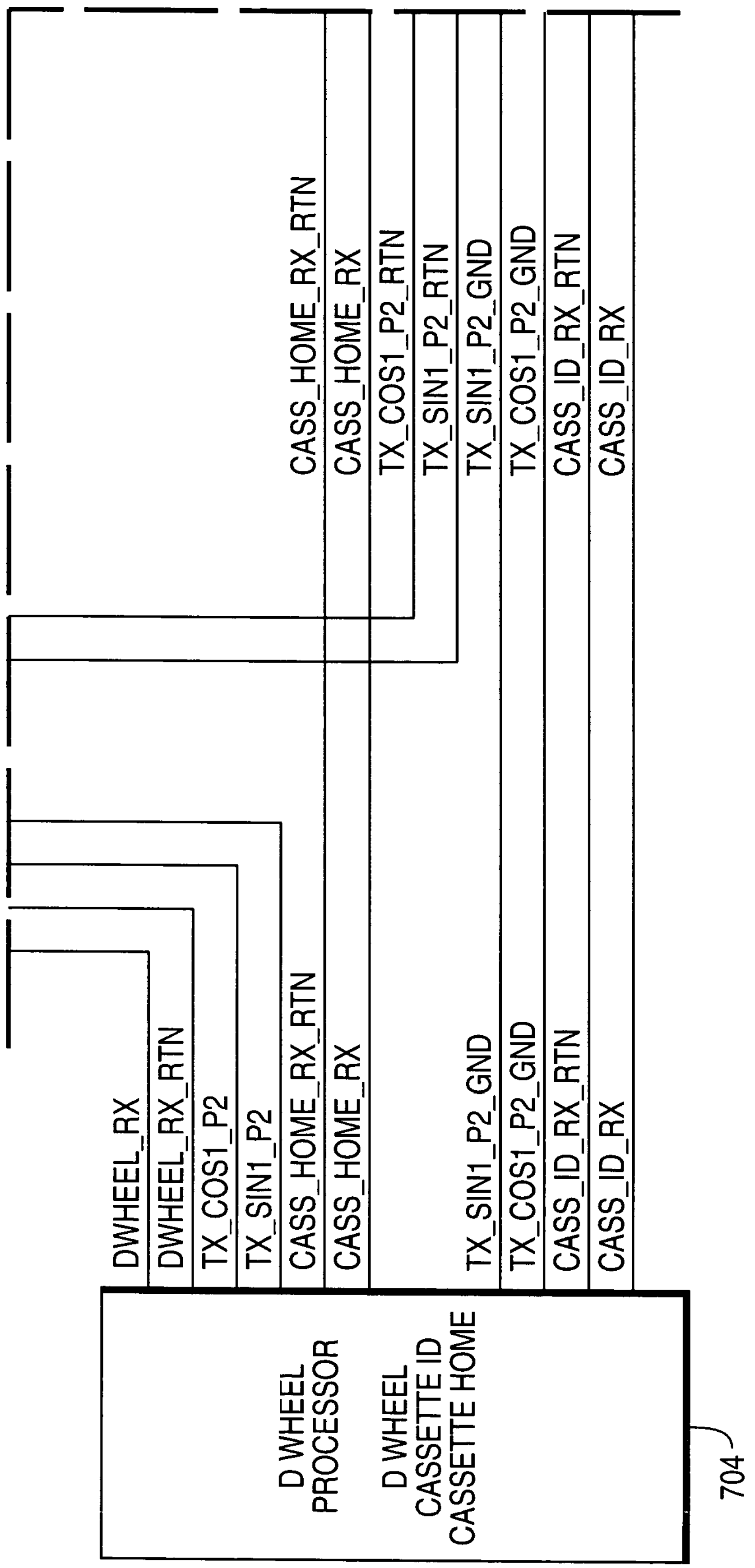
Figure 7:
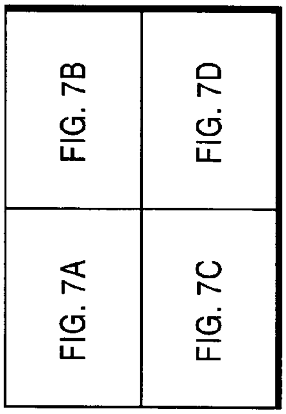
Figure 7D:
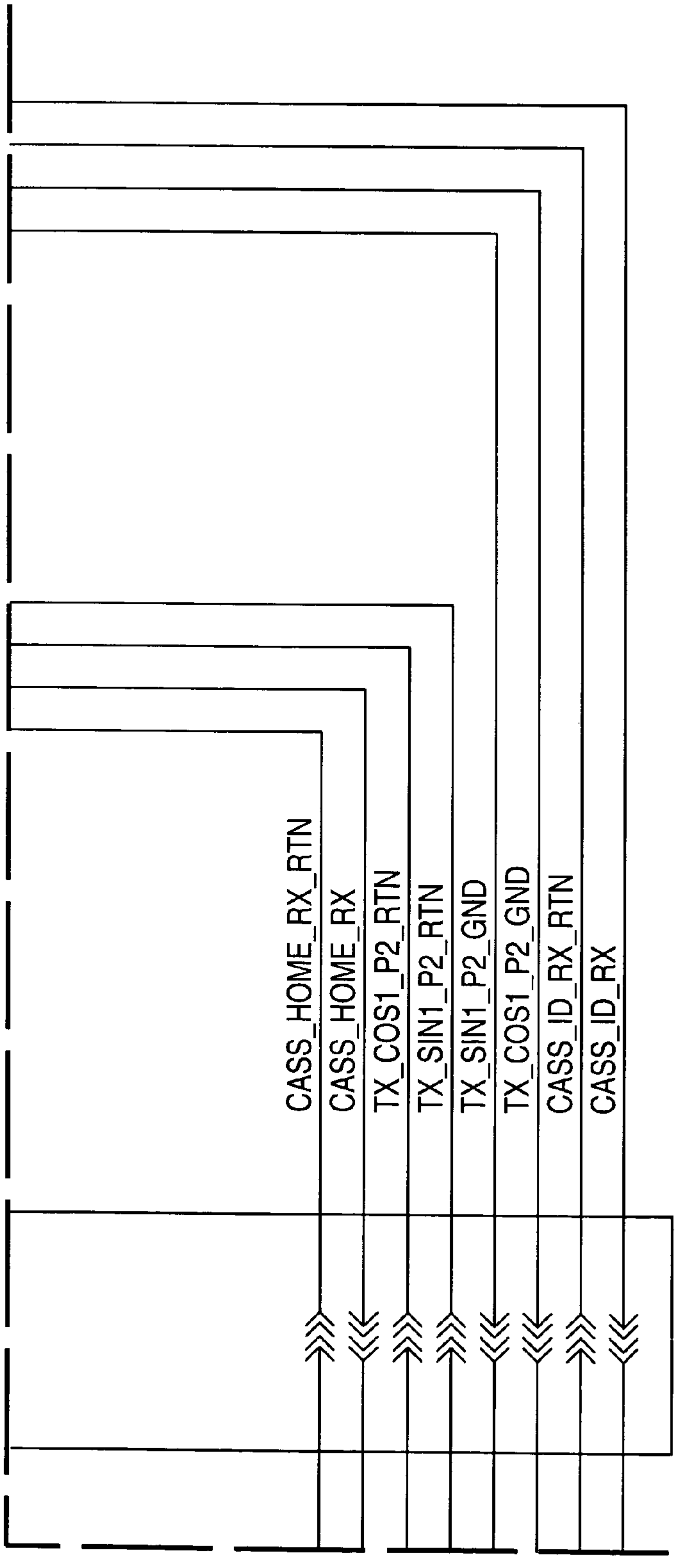

FIG. 7 shows an example signal routing diagram for the sensing system. The diagram shows a first processor (P1) 702 and a second processor (P2) 704. In this example, the first processor is used to detect the position of the cassette fill puck 223 and the second processor is used to detect the position of the cassette home puck 222 and the cassette ID puck 224. Two processors are used by way of example only and in another example only a single processor could be used to detect the position of all three pucks. The routing diagram also shows the pad 226 and a connector 706.

The sensing system comprises a separate sensing arrangement 708-710 for each of the three pucks 222-224; each sensing arrangement comprising a pair of transmit coils (TX_SIN and TX_COS) and a receive coil (RX). The transmit coils may be run in series but the receive coils are separate for each sensing arrangement.

In the above example, the three pucks 222-224 may all have the same resonant frequency because separate sensing arrangements are used to detect the position of each puck. In another alternative, a single sensing arrangement (i.e. only three coils) could be used and each puck could have a different resonant frequency (e.g. by changing the capacitor value on the PCB).

In the above example a single pad 226 is used, the pad comprising three separate sensing arrangements 708-710. In another example more than one pad could be used, e.g. one pad per sensing arrangement. This may be beneficial where the spacing of pucks is large.

In the above example, the cassette ID puck 224 uses rotational position to determine cassette type. In another example, the resonant frequency of the puck could be used to determine the cassette type.

In addition to or instead of using the cassette ID puck 224 to determine the cassette type, one of the other pucks 222, 223 may be used to provide cassette identification information. For example where a SST dispenses both currency and small media (e.g. phone top-up cards, train tickets or other credit card sized media) the cassette home puck 222 could be used to provide cassette identification information. For example, there may be two variants of the cassette home puck 222, each having a different resonant frequency, with one being used to indicate a currency cassette and the other being used to indicate a small media cassette. The cassette home puck 222 may be used in combination with the cassette ID puck 224 to identify different types of cassette (using cassette ID puck) for each variant identified by the frequency of the cassette home puck 222.

The cassette home puck 222 may be provided with visible features (e.g. screen printed alpha numeric markings) which may be visible to an operator through a transparent window provided in the side wall of the cassette.

In another example, a single puck could be used to indicate both cassette home and cassette ID. The lateral position of the puck could be used to indicate whether the cassette was correctly latched into the dispenser, as with the cassette home puck 222 described above, whilst rotational position and/or resonant frequency of the puck could be used to indicate the cassette identity.

The pucks described above are all passive, in that they do not have their own power source (unlike the pad). If the distance between the pad and the pucks was larger, active pucks could be used. Active pucks contain a power source such as a battery.

The cassette described above includes a cassette home puck, a cassette fill puck and a cassette ID puck. It will be apparent to a skilled person however that a cassette sensing system could comprise one or more pucks arranged to perform one or more of the functions described above.

The cassette sensing system describe above could be used for any type of media cassette containing any kind of media, including but not limited to, currency notes, train tickets and mobile phone top-up cards. The sensing system may be used in any kind of self-service terminal and an ATM is described above by way of example only.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

What is claimed is:

1. A sensing system for a self-service terminal comprising:

an aerial comprising at least one receive circuit; and a processor operative to determine the relative positions of elements of a first resonant circuit mounted in a media cassette upon the media cassette being inserted into the terminal, determination of the relative positions of the elements being based on a signal wirelessly received via the aerial, the processor interpreting the signal to determine the relative positions of the elements of the first resonant circuit based on information conveyed by the signal relating to self contained elements within the cassette.

2. A sensing system according to claim 1, wherein the aerial further comprises transmit circuitry for generating an alternating electro-magnetic field.

3. A sensing system according to claim 1, further comprising:

means for calculating a cassette fill metric based on the position of the first resonant circuit.

4. A sensing system according to claim 1, wherein the processor is further arranged to determine the position of a second resonant circuit mounted in a media cassette inserted into the terminal based on a signal received via the aerial, the system further comprising:

means for calculating a cassette fill metric based on the positions of the first and the second resonant circuits.

5. A sensing system according to claim 4, further comprising:

means for determining if a cassette is correctly inserted into the terminal based on the position of the second resonant circuit.

6. A sensing system according to claim 3, wherein the cassette fill metric is a percentage fill of the cassette.

7. A sensing system according to claim 4, the processor is further arranged to determine the position of a third resonant circuit mounted in a media cassette inserted into the terminal based on a signal received via the aerial, the system further comprising:

means for determining a cassette type associated with the cassette based on the rotational position of the third resonant circuit.

8. A sensing system according to claim 1, further comprising:

means for determining if a cassette is correctly inserted into the terminal based on the position of the first resonant circuit.

9. A sensing system according to claim 8, further comprising:

means for providing an alarm if a cassette is determined to be incorrectly inserted into the terminal based on the position of the first resonant circuit.

10. A sensing system according to claim 1, further comprising:

means for determining a cassette type associated with the cassette based on the rotational position of the first resonant circuit.

11. A sensing system for a self-service terminal comprising:

an aerial comprising at least one receive circuit; and a processor operative to determine the position of a first resonant circuit mounted in a media cassette inserted into the terminal based on a signal received via the aerial, the processor being further operative to determine the position of a second resonant circuit mounted in a media cassette inserted into the terminal based on a signal received via the aerial; and means for determining a cassette type associated with the cassette based on the rotational position of the second resonant circuit.

* * * * *